(12) United States Patent
Ranade

(10) Patent No.: US 8,868,655 B2
(45) Date of Patent: *Oct. 21, 2014

(54) USER AFFILIATIONS SPANNING MULTIPLE VIRTUAL SPACES

(75) Inventor: Amit Ranade, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 13/316,190

(22) Filed: Dec. 9, 2011

(65) Prior Publication Data

US 2013/0151604 A1 Jun. 13, 2013

(51) Int. Cl.
*G06F 15/16* (2006.01)

(52) U.S. Cl.
USPC ............ 709/204; 709/206; 709/224; 463/25; 463/32; 463/40; 463/41; 463/42; 715/757

(58) Field of Classification Search
USPC ................. 709/204, 206, 224; 463/1, 25, 32, 463/40–42; 715/757
See application file for complete search history.

(56) References Cited

U.S. PATENT DOCUMENTS

| | | | |
|---|---|---|---|
| 6,951,516 B1 | 10/2005 | Eguchi et al. | 463/40 |
| 7,056,217 B1 | 6/2006 | Pelkey et al. | 463/43 |
| 7,522,058 B1 * | 4/2009 | Light et al. | 340/573.1 |
| 7,780,530 B2 | 8/2010 | Ushiro et al. | 463/42 |
| 8,137,193 B1 | 3/2012 | Kelly et al. | 463/31 |
| 8,137,194 B1 | 3/2012 | Kelly et al. | 463/31 |
| 8,214,487 B2 | 7/2012 | Savoor et al. | 709/224 |
| 8,257,174 B2 | 9/2012 | Pincus et al. | 463/31 |
| 8,347,225 B2 | 1/2013 | Blinnikka et al. | 715/787 |
| 8,347,322 B1 | 1/2013 | Brown et al. | 719/328 |
| 8,353,760 B2 | 1/2013 | Ocko et al. | 463/25 |
| 8,622,828 B1 | 1/2014 | Harrington | 463/31 |

(Continued)

FOREIGN PATENT DOCUMENTS

| | | |
|---|---|---|
| EP | 2 383 683 | 11/2011 |
| WO | WO 2013/086268 | 6/2013 |
| WO | WO 2013/096261 | 6/2013 |
| WO | WO 2013/103655 | 7/2013 |

OTHER PUBLICATIONS

Johnston, Ken, VSCpr for GREE, Inc. "GREE Gaming Platform Provides Global User Base for All Developers. New Platform Offers Unified Social Gaming System", Burlingame, CA, PRWeb, Dec. 5, 2011, 2 pages.

(Continued)

*Primary Examiner* — Hitesh Patel
(74) *Attorney, Agent, or Firm* — Pillsbury Winthrop Shaw Pittman LLP

(57) ABSTRACT

Affiliations between users may be facilitated across multiple virtual spaces accessible via virtual environments. Affiliations may be established within individual ones of two or more virtual spaces. A given affiliation within a given virtual space may include a discrete group of users with a relationship having a functional significance within the given virtual space. The affiliations may include a first affiliation within a first virtual space between a group of users including a first user and a second user. A recommendation may be provided for potential affiliations to users in the two or more virtual spaces such that responsive to the first user having an account in a second virtual space, and responsive to the second user creating an account in the second virtual space, the first user may be recommended to the second user for a potential affiliation in the second virtual space based on the first affiliation.

18 Claims, 5 Drawing Sheets

(56) References Cited

U.S. PATENT DOCUMENTS

| | | | |
|---|---|---|---|
| 8,663,004 B1 | 3/2014 | Xu | 463/29 |
| 8,734,243 B2 | 5/2014 | Harrington | 463/29 |
| 2003/0078960 A1 | 4/2003 | Murren et al. | 709/203 |
| 2004/0117386 A1 | 6/2004 | Lavender et al. | 707/100 |
| 2005/0272504 A1 | 12/2005 | Eguchi et al. | 463/40 |
| 2006/0121986 A1 | 6/2006 | Pelkey et al. | 463/40 |
| 2007/0150603 A1 | 6/2007 | Crull et al. | 709/227 |
| 2007/0233736 A1 | 10/2007 | Xiong et al. | 707/104.1 |
| 2007/0274460 A1 | 11/2007 | Shaffer et al. | 379/37 |
| 2008/0119277 A1* | 5/2008 | Thelen | 463/42 |
| 2008/0134035 A1 | 6/2008 | Pennington et al. | 715/713 |
| 2008/0187143 A1 | 8/2008 | Mak-Fan | 381/17 |
| 2009/0034696 A1 | 2/2009 | Ramanathan | 379/88.17 |
| 2009/0112989 A1 | 4/2009 | Anderson et al. | 709/204 |
| 2009/0144075 A1 | 6/2009 | Flinn et al. | 705/1 |
| 2009/0172795 A1 | 7/2009 | Ritari et al. | 726/7 |
| 2009/0197681 A1* | 8/2009 | Krishnamoorthy et al. | 463/42 |
| 2009/0325712 A1 | 12/2009 | Rance | 463/42 |
| 2009/0327232 A1 | 12/2009 | Carter et al. | 707/3 |
| 2009/0327427 A1* | 12/2009 | Mathew et al. | 709/206 |
| 2009/0327882 A1 | 12/2009 | Velusamy | 715/269 |
| 2010/0024015 A1 | 1/2010 | Hardt | 726/6 |
| 2010/0063969 A1 | 3/2010 | Kasargod et al. | 707/740 |
| 2010/0106782 A1 | 4/2010 | Huang et al. | 709/206 |
| 2010/0169798 A1 | 7/2010 | Hyndman et al. | 715/757 |
| 2010/0197409 A1 | 8/2010 | Van Luchene | 463/42 |
| 2010/0216553 A1* | 8/2010 | Chudley et al. | 463/42 |
| 2010/0228617 A1 | 9/2010 | Ransom et al. | 705/14.25 |
| 2010/0229106 A1 | 9/2010 | Lee et al. | 715/757 |
| 2010/0235754 A1 | 9/2010 | Leitheiser | 715/742 |
| 2010/0304862 A1 | 12/2010 | Coleman et al. | 463/32 |
| 2011/0014972 A1 | 1/2011 | Herrmann et al. | 463/25 |
| 2011/0016488 A1 | 1/2011 | Athias | 725/53 |
| 2011/0022450 A1 | 1/2011 | Meredith | 705/14.4 |
| 2011/0107239 A1 | 5/2011 | Adoni et al. | 715/757 |
| 2011/0131508 A1 | 6/2011 | Gershfang et al. | 715/757 |
| 2011/0151976 A1 | 6/2011 | Holloway et al. | 463/42 |
| 2011/0202605 A1 | 8/2011 | Shochet et al. | 709/205 |
| 2011/0212783 A1 | 9/2011 | Dale et al. | 463/42 |
| 2011/0237335 A1 | 9/2011 | Holloway et al. | 463/42 |
| 2011/0238608 A1 | 9/2011 | Sathish | 706/47 |
| 2011/0250949 A1 | 10/2011 | Van Os et al. | 463/25 |
| 2011/0269548 A1 | 11/2011 | Barclay et al. | 463/42 |
| 2012/0047008 A1 | 2/2012 | Alhadeff et al. | 705/14.16 |
| 2012/0054646 A1 | 3/2012 | Hoomani et al. | 715/758 |
| 2012/0077523 A1 | 3/2012 | Roumeliotis et al. | 455/456.3 |
| 2012/0124147 A1 | 5/2012 | Hamlin et al. | 709/206 |
| 2012/0142429 A1 | 6/2012 | Muller | 463/42 |
| 2012/0202587 A1 | 8/2012 | Allen et al. | 463/25 |
| 2012/0227086 A1 | 9/2012 | Dale et al. | 726/3 |
| 2012/0252579 A1* | 10/2012 | Sethi et al. | 463/40 |
| 2012/0290949 A1* | 11/2012 | Elenzil et al. | 715/753 |
| 2013/0005476 A1* | 1/2013 | Keswani et al. | 463/42 |
| 2013/0014033 A1 | 1/2013 | Hamick et al. | 715/757 |
| 2013/0091221 A1 | 4/2013 | Bennett | 709/204 |
| 2013/0143669 A1 | 6/2013 | Muller | 463/42 |
| 2013/0159430 A1 | 6/2013 | Ranade | 709/206 |
| 2013/0172085 A1 | 7/2013 | Harrington | 463/42 |

OTHER PUBLICATIONS

"Buddy Rush:: The World's Best Cross-platform RPG!", http://buddyrush.sollmo.com/, printed Nov. 28, 2011, copyright 2011 by Team Sollmo with Company 11, Inc., 2 pages.

"FriendFeed", definition from Wikipedia, the free encyclopedia, printed Nov. 28, 2011, 3 pages.

Webster, Andrew, "Social games need to become truly cross-platform", http://www.gamezebo.com/news/2011/06/08/social-games-need-become-truly-cross-platform, posted Jun. 8, 2011, printed Nov. 28, 2011, 2 pages.

Hendrickson, Mark, "Watch Out FriendFeed: Socialthing! Is Even Easier to Use", http://techcrunch.com/2008/03/10/watch-out-friendfeed-socialthing-is-even-easier-to-use/, posted Mar. 10, 2008, printed Nov. 28, 2011, 2 pages.

\* cited by examiner

USER AFFILIATIONS SPANNING MULTIPLE VIRTUAL SPACES

FIELD OF THE DISCLOSURE

This disclosure relates to facilitate affiliations between users across two or more virtual spaces accessible via virtual environments.

BACKGROUND

Systems exist for forming and/or recognizing affiliations between users of virtual spaces (e.g., video games or other virtual spaces). An affiliation may include an alliance, guild, cohort, and/or other affiliation with a discrete group of users. Typically, however, existing approaches involve affiliations limited to a single virtual space.

SUMMARY

One aspect of the disclosure relates to a system configured to facilitate affiliations between users across two or more virtual spaces accessible via a virtual environment, in accordance with one or more implementations. In exemplary implementations, a group of users may belong to an affiliation within a first virtual space. For example, the group of users may belong to an alliance within a social network game played in a social network virtual environment. The same affiliation may be "transported" to other virtual spaces such that the same group of users are affiliated in more that one virtual space. The affiliations in different virtual spaces, which include substantially the same group of users, may be encompassed by an overarching affiliation. In some implementations, the system may include one or more of at least one virtual environment server, at least one virtual space server, one or more client computing platforms, and/or other components.

The virtual environment server may be configured to execute one or more computer program modules. The computer program modules may include one or more of a user module, an environment module, an interaction module, a relationship module, and/or other modules. The user module may be configured to access and/or manage one or more user profiles and/or user information associated with users of the system.

The environment module may be configured to provide one or more virtual environments to users via the client computing platforms. As used herein, a "virtual environment" may include one or more interactive, electronic social media, and/or other virtual environments. Interactive, electronic social media may include one or more of a social network, a virtual space, a micro-blogging service, a blog service (or host), a messaging service, a message board, a forum, and/or other electronically distributed media that are scalable and enable interaction between the users.

The interaction module may be configured to monitor interactions of the users with the virtual environment and/or each other within the virtual environment. This may include monitoring, for a given user, one or more of times at which the given user is logged in to the virtual environment, areas of the virtual environment the given user views or interacts with or in, other users the given user interacts with, the nature and/or content of interactions of the given user with other users, activities participated in within the virtual environment, level, powers, or skill attained in the virtual environment, inventory items obtained in the virtual environment, and/or other interactions of the given user with the virtual environment and/or other users.

At a given time, interaction module may determine a set of users that are currently engaged with the virtual environment and/or a set of users that are currently not engaged with the virtual environment. Being engaged with the virtual environment may refer to being logged in to the virtual environment, performing some action or interaction within the virtual environment within some period of time (e.g., the last 2 minutes), and/or other taking some other action indicating ongoing and contemporaneous engagement with the virtual environment.

The relationship module may be configured to establish relationships between users within the virtual environment. Such relationships may include one or more of friendships, connections, followers, social links, and/or other relationships. The relationship module may establish relationships based on relationship requests and acceptances received from users. Relationships may include one or more types of relationships that have a functional purpose or impact within the virtual environment, and/or one or more types of relationships that a social construct within the virtual environment that does not have a functional result.

The virtual space server may be configured to execute one or more computer program modules. The computer program modules may include one or more of a space module, a space account module, a group module, a recommendation module, a translation module, an overarching group module, a communications module, and/or other modules.

The space module may be configured to provide one or more virtual spaces to users via client computing platforms. As used herein, a "virtual space" may include one or more social network games and/or other virtual spaces. A virtual space may be provided via a virtual environment provided by the environment module of the virtual environment server. For example, a user may be required to be engaged in a virtual environment in order to engage in a virtual space. According to various implementations, one or more instances of a single given virtual space may be provided via one or more different virtual environments.

The space module may determine views of the virtual space. The views may then be communicated (e.g., via streaming, via object/position data, and/or other information) from the virtual space server to the client computing platforms for presentation to users. The view determined and transmitted to a given client computing platform may correspond to a user character being controlled by a user via the given client computing platform. The view determined and transmitted to a given client computing platform may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

An instance of a virtual space may comprise a simulated space that is accessible by users via clients (e.g., the client computing platforms) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface)

that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

Within the instance(s) of a virtual space executed by the space module, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through the client computing platforms. The users may interact with each other through communications exchanged within the virtual space. Such communications may include one or more of textual chat, instant messages, private messages, voice communications, and/or other communications. Communications may be received and entered by the users via their respective client computing platforms. Communications may be routed to and from the appropriate users through the virtual space server and/or the virtual environment server. Within the virtual space, users may participate in a game. The game may be an activity within the space (e.g., a virtual card or board game within the space), or the game may actually be the space (e.g., an online role-playing game, massively multiplayer online game, a social online game, and/or other games).

The space account module may be configured to manage accounts associated with the individual users for individual virtual spaces. The accounts may include user information associated with the individual users. Such user information may include one or more of identification information; inventory information; financial information; relationship information; information related to the users determined by one or more other modules; demographic information; usage information; past purchase history; and/or other information related to the users. The identification information may include one or more of a username, an avatar name, a real world identification, and/or other identification information. The inventory information may identify virtual objects, virtual currency, and/or other assets available to the users. The virtual objects and/or virtual currency available to a given user may include the virtual objects and/or the virtual currency that is under the control of the given user within the virtual space. The financial information may include payment information such as an account identification that identifies an account that can be used by the user to purchase virtual goods and/or virtual currency for use within the virtual space. The funds available in the account may include real world money or funds, virtual money or funds that are not usable within the virtual space, and/or other funds.

The group module may be configured to a group module configured to establish and/or manage affiliations within individual virtual spaces. A given affiliation within a given virtual space may include a discrete group of users. For example, a first affiliation within a first virtual space may include a first user, a second user, and/or a discrete set of other users. Examples of an affiliation may include an alliance, a guild, a faction, a club, an association, a group, a crew, a band, a clan, a family, fellowship, a gang, a league, a partnership, a syndicate, a society, a tribe, a troop, a company, and/or other affiliations that include a discrete group of individuals.

The group module may establish affiliations based on affiliation requests and acceptances received from users. Establishment of an affiliation may be initiated by a single communication (e.g., a request) initiated by a given user requesting an affiliation between the given user and one or more other users. Establishment of an affiliation may require a first communication from the given user to be approved by the one or more other users. According to some implementations, the group module may establish affiliations intrinsically within the virtual space (e.g., faction-mates are formed based on avatar configuration), through recognized user behavior over time (e.g., raid members or player-versus-player partners), and/or other approaches for establishing affiliations.

Users belonging to an affiliation may have relationships with some or no functional significance, purpose, and/or impact within a given virtual space. Such relationships within the affiliation may include a leadership structure, a role structure, and/or other relationships within the affiliation. The functional significance of a relationship between users may vary across different virtual spaces. For example, a relationship between the first user and the second user in the first affiliation within the first virtual space may have a different functional significance than a relationship between the first user and the second user in a second affiliation in a second virtual space. By way of non-limiting example of the functional significance of an affiliation within an exemplary virtual space, affiliates within a virtual space may have certain capabilities among each other that are not available to non-affiliates such as sharing and/or trading goods, services, player characters, and/or items in the virtual space; and/or other capabilities among users belonging to an affiliation.

The recommendation module may be configured to recommend potential affiliations to users in the two or more virtual spaces. For example, where the first user and the second user belong to the first affiliation in the first virtual space, the recommendation module may be configured such that responsive to the first user having an account in a second virtual space, and responsive to the second user creating an account in the second virtual space, the first user is recommended to the second user for a potential affiliation in the second virtual space based on the first affiliation. The recommendation module may be configured to enable the second user to opt-in or opt-out of the potential affiliation with the first user.

The translation module may be configured to translate relationships associated with an affiliation to relationships associated with another affiliation. For example, the translation module may translate a relationship between the first user and the second user in the first affiliation within the first virtual space to a potential relationship between the first user and the second user in the potential affiliation in the second virtual space. The potential affiliation recommended to the second user may be determined based on parameters of the first affiliation. Examples of parameters of an affiliation may include one or more of an affiliation type, an amount of time two or more users (e.g., the first user and the second user) spent engaging the virtual space together, a value added by the affiliation for the users, a caliber of the affiliation relative to other affiliations in the same virtual space, a progress level of the affiliation within the virtual space, and/or other affiliation parameters.

The overarching group module may be configured to determine one or more overarching affiliations. An overarching affiliation may encompass two or more affiliations from different virtual spaces that include substantially the same group of users. By way of non-limiting example, a given overarching affiliation may encompass an affiliation in one virtual space (e.g., a team) and an affiliation in another virtual space (e.g., a gang), where the two affiliations include substantially the same group of users. A given overarching affiliation may facilitate one or more of a cooperative attack, a cooperative defense, resource trading, troupe enforcements, and/or other actions carried out by a group in individual virtual spaces by individual users belonging to the given overarching affiliation. The group module may be configured to automatically include a given user belonging to a given overarching affiliation in individual affiliations encompassed by the given overarching affiliation. A given user may be enabled to opt-in or opt-out of being automatically included in individual affiliations encompassed by an overarching affiliation.

The overarching group module may be configured to link affiliations from different virtual spaces to yield an overarching affiliation. Such linking may be performed automatically, manually, and/or by a combination of automatic and manual operations. In some implementations, the overarching group module may monitor affiliations in two or more virtual spaces to determine affiliations including substantially the same group of users for inclusion in an overarching affiliation. A user belonging to affiliations in different virtual spaces may manually link the affiliations so as to be encompassed by an overarching affiliation. In some implementations, responsive to a first user joining a first affiliation in a first virtual space, the first user may be presented with an option to join one or more other affiliations in other virtual spaces that are encompassed by the same overarching affiliation as the first affiliation. Such an option may be presented even if the first user has not engaged one or more of the other virtual spaces, according to some implementations.

The communications module may be configured to facilitate communications between users belonging to a common overarching affiliation. Such communications may occur within a virtual environment provided by the environment module of the virtual environment server. In some implementations, communications among users belonging to a common overarching affiliation may occur outside of the virtual environment. This may be the case where the overarching affiliation encompasses affiliations in different virtual spaces that are accessed via different virtual environments.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
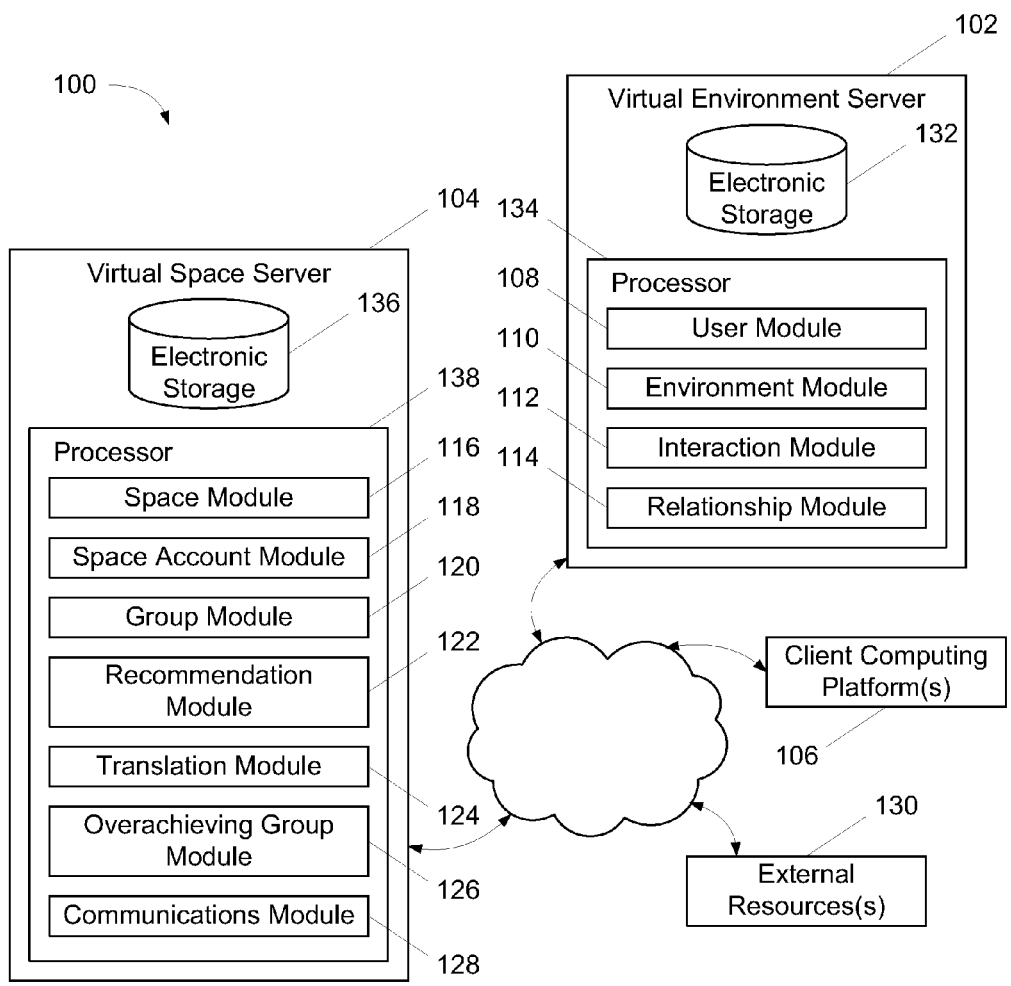
FIG. 1 illustrates a system configured to facilitate affiliations between users across two or more virtual spaces accessible via virtual environments, in accordance with one or more implementations.

FIG. 1 illustrates a system 100 configured to facilitate affiliations between users across two or more virtual spaces accessible via a virtual environment, in accordance with one or more implementations. In exemplary implementations, a group of users may belong to an affiliation within a first virtual space. For example, the group of users may belong to an alliance within a social network game played in a social network virtual environment. The same affiliation may be "transported" to other virtual spaces such that the same group of users are affiliated in more that one virtual space. The affiliations in different virtual spaces, which include substantially the same group of users, may be encompassed by an overarching affiliation.

In some implementations, system 100 may include one or more of at least one virtual environment server 102, at least one virtual space server 104, and/or other components. The virtual environment server 102 and/or virtual space server 104 may be configured to communicate with one or more client computing platforms 106 according to a client/server architecture to provide the virtual environment and/or the virtual space to users via client computing platforms 106. The virtual space server 104 may be configured to interface with virtual environment server 102 to supplement the functionality provided to the users with respect to the virtual environment and/or the virtual space. For example, virtual space server 104 may interface with virtual environment server 102 via one or more application programming interfaces.

The virtual environment server 102 may be configured to execute one or more computer program modules. The computer program modules may include one or more of a user module 108, an environment module 110, an interaction module 112, a relationship module 114, and/or other modules.

The user module 108 may be configured to access and/or manage one or more user profiles and/or user information associated with users of system 100. The one or more user profiles and/or user information may include information stored by virtual environment server 102, virtual space server 104, one or more of the client computing platforms 106, and/or other storage locations. The user profiles may include, for example, information identifying users (e.g., a username or handle, a number, an identifier, and/or other identifying information) within the virtual environment, security login information (e.g., a login code or password), virtual environment account information, subscription information, virtual currency account information (e.g., related to currency held in credit for a user), relationship information (e.g., information related to relationships between users in the virtual environment), virtual environment usage information, demographic information associated with users, interaction history among users in the virtual environment, information stated by users, purchase information of users, browsing history of users, a client computing platform identification associated with a user, a phone number associated with a user, and/or other information related to users.

The environment module 110 may be configured to provide one or more virtual environments to users via client computing platforms 106. As used herein, a "virtual environment" may include one or more interactive, electronic social media, and/or other virtual environments. Interactive, electronic social media may include one or more of a social network, a virtual space, a micro-blogging service, a blog service (or host), a messaging service, a message board, a forum, and/or other electronically distributed media that are scalable and enable interaction between the users. Some non-limiting specific examples of interactive, electronic social media may include the social network provided by Facebook™, the social network provided by MySpace™, the social network provided by Google+™, the social network provided by Qzone™, the social network provided by Foursquare®, the micro-blogging service provided by Twitter™, the virtual world provided by SecondLife®, the massively multi-player online game provided by World of Warcraft®, the file sharing service provided by Flickr®, Blogger, YouTube, PlayStation® Home, Xbox® Live, and/or other interactive, electronic social media.

The interaction module 112 may be configured to monitor interactions of the users with the virtual environment and/or each other within the virtual environment. This may include monitoring, for a given user, one or more of times at which the given user is logged in to the virtual environment, areas of the virtual environment the given user views or interacts with or in, other users the given user interacts with, the nature and/or content of interactions of the given user with other users, activities participated in within the virtual environment, level, powers, or skill attained in the virtual environment, inventory items obtained in the virtual environment, and/or other interactions of the given user with the virtual environment and/or other users. Some or all of the information generated by interaction module 112 in monitoring the interactions of the users may be stored to the user profiles managed by user module 108.

At a given time, interaction module 112 may determine a set of users that are currently engaged with the virtual environment and/or a set of users that are currently not engaged with the virtual environment. Being engaged with the virtual environment may refer to being logged in to the virtual environment, performing some action or interaction within the virtual environment within some period of time (e.g., the last 2 minutes), and/or other taking some other action indicating ongoing and contemporaneous engagement with the virtual environment.

The relationship module 114 may be configured to establish relationships between users within the virtual environment. Such relationships may include one or more of friendships, connections, followers, social links, and/or other relationships. The relationship module 114 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual environment, and/or one or more types of relationships that a social construct within the virtual environment that does not have a functional result.

The virtual space server 104 may be configured to execute one or more computer program modules. The computer program modules may include one or more of a space module 116, a space account module 118, a group module 120, a recommendation module 122, a translation module 124, an overarching group module 126, a communications module 128, and/or other modules.

The space module 116 may be configured to provide one or more virtual spaces to users via client computing platforms 106. As used herein, a "virtual space" may include one or more social network games and/or other virtual spaces. A virtual space may be provided via a virtual environment provided by environment module 110 of virtual environment server 102. For example, a user may be required to be engaged in a virtual environment in order to engage in a virtual space. According to various implementations, one or more instances of a single given virtual space may be provided via one or more different virtual environments.

The space module 116 may determine views of the virtual space. The views may then be communicated (e.g., via streaming, via object/position data, and/or other information) from virtual space server 104 to client computing platforms 106 for presentation to users. The view determined and transmitted to a given client computing platform 106 may correspond to a user character being controlled by a user via the given client computing platform 106. The view determined and transmitted to a given client computing platform 106 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

An instance of a virtual space may comprise a simulated space that is accessible by users via clients (e.g., client computing platforms 106) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of virtual spaces are determined by space module 116 is not intended to be limiting. The space module 116 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of a virtual space executed by space module 116, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 106. The users may interact with each other through communications exchanged within the virtual space. Such communications may include one or more of textual chat, instant messages, private messages, voice communications, and/or other communications. Communications may be received and entered by the users via their respective client computing platforms 106. Communications may be routed to and from the appropriate users through virtual space server 104 and/or virtual environment server 102. Within the virtual space, users may participate in a game. The game may be an activity within the space (e.g., a virtual card or board game within the space), or the game may actually be the space (e.g., an online role-playing game, massively multiplayer online game, a social online game, and/or other games).

The space account module 118 may be configured to manage accounts associated with the individual users for individual virtual spaces. The accounts may include user information associated with the individual users. Such user information may include one or more of identification information; inventory information; financial information; relationship information; information related to the users determined by one or more of the other modules 116, 120, 122, 124, 126, and/or 128; demographic information; usage information; past purchase history; and/or other information related to the users. The identification information may include one or more of a username, an avatar name, a real world identification, and/or other identification information. The inventory information may identify virtual objects, virtual currency, and/or other assets available to the users. The virtual objects and/or virtual currency available to a given user may include the virtual objects and/or the virtual currency that is under the control of the given user within the virtual space. The financial information may include payment information such as an account identification that identifies an account that can be used by the user to purchase virtual goods and/or virtual currency for use within the virtual space. The funds available in the account may include real world money or funds, virtual money or funds that are not usable within the virtual space, and/or other funds.

The group module 120 may be configured to a group module configured to establish and/or manage affiliations within individual virtual spaces. A given affiliation within a given virtual space may include a discrete group of users. For example, a first affiliation within a first virtual space may include a first user, a second user, and/or a discrete set of other users. Examples of an affiliation may include an alliance, a guild, a faction, a club, an association, a group, a crew, a band, a clan, a family, fellowship, a gang, a league, a partnership, a syndicate, a society, a tribe, a troop, a company, and/or other affiliations that include a discrete group of individuals.

The group module 120 may establish affiliations based on affiliation requests and acceptances received from users. Establishment of an affiliation may be initiated by a single communication (e.g., a request) initiated by a given user requesting an affiliation between the given user and one or more other users. Establishment of an affiliation may require a first communication from the given user to be approved by the one or more other users. According to some implementations, group module 120 may establish affiliations intrinsically within the virtual space (e.g., faction-mates are formed based on avatar configuration), through recognized user behavior over time (e.g., raid members or player-versus-player partners), and/or other approaches for establishing affiliations.

Users belonging to an affiliation may have relationships with some or no functional significance, purpose, and/or impact within a given virtual space. Such relationships within the affiliation may include a leadership structure, a role structure, and/or other relationships within the affiliation. The functional significance of a relationship between users may vary across different virtual spaces. For example, a relationship between the first user and the second user in the first affiliation within the first virtual space may have a different functional significance than a relationship between the first user and the second user in a second affiliation in a second virtual space. By way of non-limiting example of the functional significance of an affiliation within an exemplary virtual space, affiliates within a virtual space may have certain capabilities among each other that are not available to non-affiliates such as sharing and/or trading goods, services, player characters, and/or items in the virtual space; and/or other capabilities among users belonging to an affiliation.

The recommendation module 122 may be configured to recommend potential affiliations to users in the two or more virtual spaces. For example, where the first user and the second user belong to the first affiliation in the first virtual space, recommendation module 122 may be configured such that responsive to the first user having an account in a second virtual space, and responsive to the second user creating an account in the second virtual space, the first user is recommended to the second user for a potential affiliation in the second virtual space based on the first affiliation. The recommendation module 122 may be configured to enable the second user to opt-in or opt-out of the potential affiliation with the first user.

The translation module 124 may be configured to translate relationships associated with an affiliation to relationships associated with another affiliation. For example, translation module 124 may translate a relationship between the first user and the second user in the first affiliation within the first virtual space to a potential relationship between the first user and the second user in the potential affiliation in the second virtual space. The potential affiliation recommended to the second user may be determined based on parameters of the first affiliation. Examples of parameters of an affiliation may include one or more of an affiliation type, an amount of time two or more users (e.g., the first user and the second user) spent engaging the virtual space together, a value added by the affiliation for the users, a caliber of the affiliation relative to other affiliations in the same virtual space, a progress level of the affiliation within the virtual space, and/or other affiliation parameters.

The overarching group module 126 may be configured to determine one or more overarching affiliations. An overarching affiliation may encompass two or more affiliations from different virtual spaces that include substantially the same group of users. By way of non-limiting example, a given overarching affiliation may encompass an affiliation in one virtual space (e.g., a team) and an affiliation in another virtual space (e.g., a gang), where the two affiliations include substantially the same group of users. A given overarching affiliation may facilitate one or more of a cooperative attack, a cooperative defense, resource trading, troupe enforcements, and/or other actions carried out by a group in individual virtual spaces by individual users belonging to the given overarching affiliation. The group module 120 may be configured to automatically include a given user belonging to a given overarching affiliation in individual affiliations encompassed by the given overarching affiliation. A given user may be enabled to opt-in or opt-out of being automatically included in individual affiliations encompassed by an overarching affiliation.

The overarching group module 126 may be configured to link affiliations from different virtual spaces to yield an overarching affiliation. Such linking may be performed automatically, manually, and/or by a combination of automatic and manual operations. In some implementations, overarching group module 126 may monitor affiliations in two or more virtual spaces to determine affiliations including substantially the same group of users for inclusion in an overarching affiliation. A user belonging to affiliations in different virtual spaces may manually link the affiliations so as to be encompassed by an overarching affiliation. In some implementations, responsive to a first user joining a first affiliation in a first virtual space, the first user may be presented with an option to join one or more other affiliations in other virtual spaces that are encompassed by the same overarching affiliation as the first affiliation. Such an option may be presented even if the first user has not engaged one or more of the other virtual spaces, according to some implementations.

The communications module 128 may be configured to facilitate communications between users belonging to a common overarching affiliation. Such communications may occur within a virtual environment provided by environment module 110 of virtual environment server 102. In some implementations, communications among users belonging to a common overarching affiliation may occur outside of the virtual environment. This may be the case where the overarching affiliation encompasses affiliations in different virtual spaces that are accessed via different virtual environments.

In some implementations, virtual environment server 102, virtual space server 104, client computing platforms 106, one or more external resources 130, and/or other components of system 100 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which virtual environment server 102, virtual space server 104, client computing platforms 106, external resources 130, and/or other components of system 100 may be operatively linked via some other communication media.

The virtual environment server 102 may comprise electronic storage 132, one or more processors 134, and/or other components. The virtual environment server 102 may include communication lines, or ports to enable the exchange of information with a network and/or other computing platforms. The processors 134 may be configured to execute computer program modules. The processors 134 may be configured to execute the computer program modules via one or more of hardware, software, and/or firmware. The computer program modules may include user module 108, environment module 110, interaction module 112, relationship module 114, and/or other computer program modules. Although system 100 may be described in certain sections herein as including virtual environment server 102, this is not intended to be limiting. The virtual environment server 102 may be separate and distinct from system 100, and may be provided by an entity that is separate from, for example, the entity providing virtual space server 104. In some implementations, the functionality attributed herein to virtual environment server 102 may be provided by virtual space server 104.

A given client computing platform 106 may include one or more processors configured to execute computer program modules. The computer program modules may be configured to enable an expert or user associated with the given client computing platform 106 to interface with virtual environment server 102, virtual space server 104, and/or other components of system 100, and/or provide other functionality attributed herein to client computing platforms 106. By way of non-limiting example, the given client computing platform 106 may include one or more of a desktop computer, a laptop computer, a handheld computer, a NetBook, a Smartphone, a gaming console, and/or other computing platforms.

The external resources 130 may include sources of information, hosts and/or providers of virtual environments and/or virtual spaces outside of system 100, external entities participating with system 100, and/or other resources. In some implementations, some or all of the functionality attributed herein to external resources 130 may be provided by resources included in system 100.

The virtual space server 104 may include electronic storage 136, one or more processors 138, and/or other components. The virtual space server 104 may include communication lines, or ports to enable the exchange of information with a network and/or other computing platforms. Illustration of virtual space server 104 in FIG. 1 is not intended to be limiting. The virtual space server 104 may include a plurality of hardware, software, and/or firmware components operating together to provide the functionality attributed herein to virtual space server 104. For example, virtual space server 104 may be implemented by a cloud of computing platforms operating together as virtual space server 104.

Electronic storage 136 may comprise electronic storage media that electronically stores information. The electronic storage media of electronic storage 136 may include one or both of system storage that is provided integrally (i.e., substantially non-removable) with virtual space server 104 and/or removable storage that is removably connectable to virtual space server 104 via, for example, a port (e.g., a USB port, a firewire port, etc.) or a drive (e.g., a disk drive, etc.). Electronic storage 136 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 136 may include one or more virtual storage resources (e.g., cloud storage, a virtual private network, and/or other virtual storage resources). Electronic storage 136 may store software algorithms, information determined by processor 138, information received from virtual environment server 102, information received from client computing platforms 106, and/or other information that enables virtual space server 104 to function as described herein.

Processor(s) 138 is configured to provide information processing capabilities in virtual space server 104. As such, processor 138 may include one or more of a digital processor, an analog processor, a digital circuit designed to process information, an analog circuit designed to process information, a state machine, and/or other mechanisms for electronically processing information. Although processor 138 is shown in FIG. 1 as a single entity, this is for illustrative purposes only. In some implementations, processor 138 may include a plurality of processing units. These processing units may be physically located within the same device, or processor 138 may represent processing functionality of a plurality of devices operating in coordination. The processor 138 may be configured to execute space module 116, space account module 118, group module 120, recommendation module 122, overarching group module 126, communications module 128, translation module 124, and/or other computer program modules. Processor 138 may be configured to execute modules 116, 118, 120, 122, 124, 126, 128, and/or other modules by software; hardware; firmware; some combination of software, hardware, and/or firmware; and/or other mechanisms for configuring processing capabilities on processor 138.

It should be appreciated that although modules 116, 118, 120, 122, 124, 126, and 128 are illustrated in FIG. 1 as being co-located within a single processing unit, in implementations in which processor 138 includes multiple processing units, one or more of modules 116, 118, 120, 122, 124, 126, and/or 128 may be located remotely from the other modules. The description of the functionality provided by the different modules 116, 118, 120, 122, 124, 126, and/or 128 described below is for illustrative purposes, and is not intended to be limiting, as any of modules 116, 118, 120, 122, 124, 126, and/or 128 may provide more or less functionality than is described. For example, one or more of modules 116, 118, 120, 122, 124, 126, and/or 128 may be eliminated, and some or all of its functionality may be provided by other ones of modules 116, 118, 120, 122, 124, 126, and/or 128. As another example, processor 138 may be configured to execute one or more additional modules that may perform some or all of the functionality attributed below to one of modules 116, 118, 120, 122, 124, 126, and/or 128.

Figure 2:
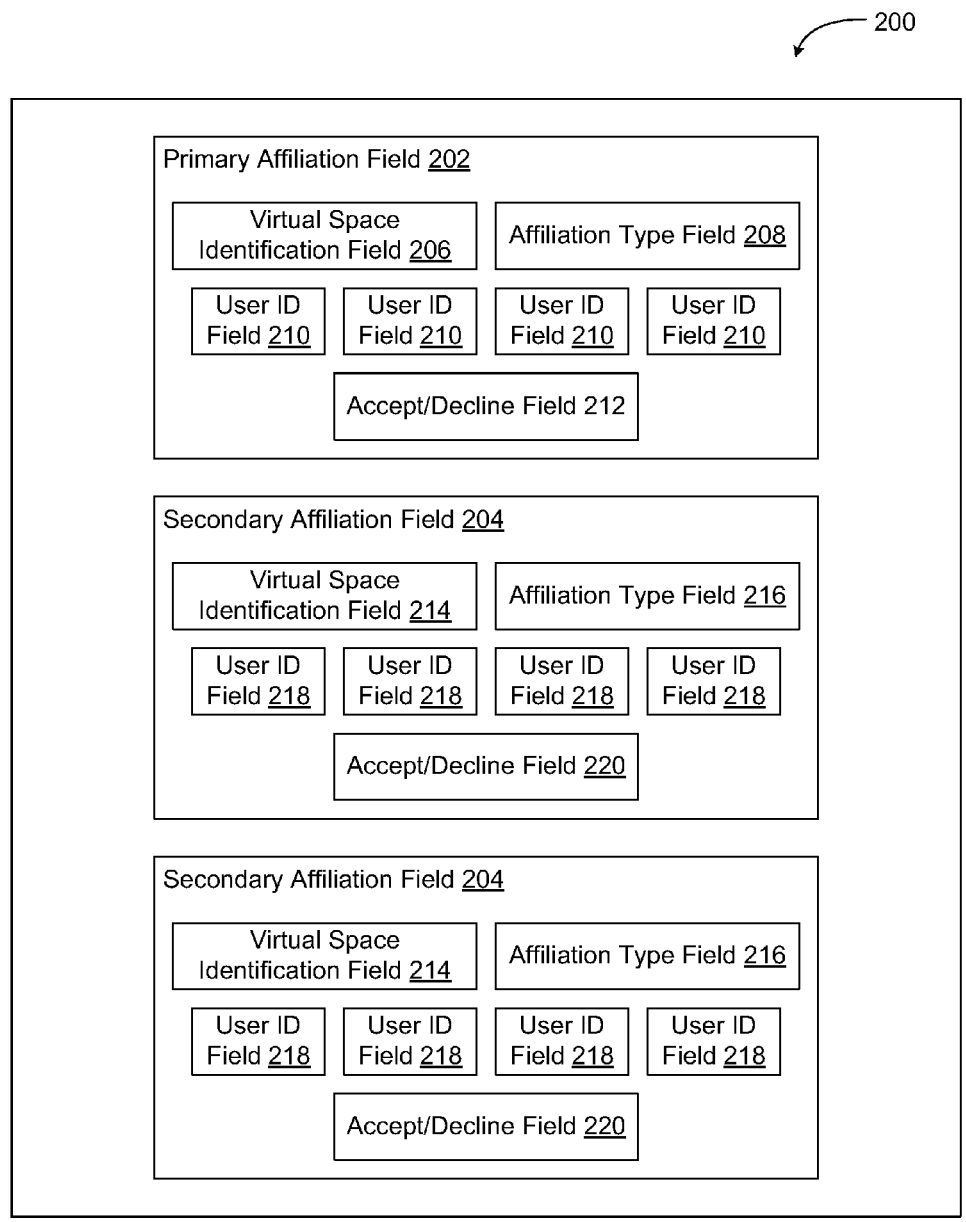
FIG. 2 illustrates a user interface configured to enable a user to join one or more affiliations in different virtual spaces encompassed by a single overarching affiliation, in accordance with one or more implementations.

FIG. 2 illustrates a user interface 200 configured to enable a first user to join one or more affiliations in different virtual spaces encompassed by a single overarching affiliation, in accordance with one or more implementations. The user interface 200 may be presented to the first user via a client computing platform 106 associated with the first user. The user interface 200 may be presented within a virtual environment provided by virtual environment server 102, within a virtual space provided by virtual space server 104, and/or outside of a virtual environment and/or virtual space. The user interface 200 may be provided by recommendation module 122, overarching group module 124, and/or other modules of virtual space server 104. The user interface 200 may be presented to the first user responsive to the first user joining an affiliation encompassed by an overarching affiliation; the first user belonging to an affiliation encompassed by an overarching affiliation and engaging in the virtual space in which that affiliation exists; the first user engaging in a virtual space in which an affiliation exists that is encompassed by an overarching affiliation, wherein the first user does not belong to that affiliation, but belongs to another affiliation in another virtual space that is also encompassed by the overarching affiliation; and/or other actions by the first user and/or other users. As depicted in FIG. 2, user interface 200 includes one or more primary affiliation fields 202, one or more secondary affiliation fields 204, and/or other elements. The depiction of user interface 200 in FIG. 2 is not intended to be limiting as user interface 200 may include more or less elements than those shown.

The primary affiliation fields 202 may be associated with primary affiliations, while secondary affiliation fields 204 may be associated with secondary affiliations. The first user may belong to the primary affiliations. The first user may not belong to the secondary affiliations. The primary and secondary affiliations may be encompassed by the same overarching affiliation. The first user may be currently engaged in a virtual space in which a primary affiliation exists, currently engaged in a virtual environment in which such a virtual space can be accessed, and/or not engaged in such a virtual space and/or virtual environment.

A given one of the primary affiliation fields 202 associated with a given primary affiliation may include one or more of a virtual space identification field 206, an affiliation type field 208, one or more user identification fields 210, an accept/decline field 212, and/or other fields and/or information associated with the given primary affiliation.

The virtual space identification field 206 may include information that identifies a virtual space in which the given primary affiliation exists. Examples of information that identifies a virtual space may include one or more of a name of a virtual space, an image associated with a virtual space, and/or other information configured to identify a virtual space.

The affiliation type field 208 may include information that identifies a type of the given primary affiliation. Examples of a type of a primary affiliation may include one or more of an alliance, a guild, a faction, a club, an association, a group, a crew, a band, a clan, a family, fellowship, a gang, a league, a partnership, a syndicate, a society, a tribe, a troop, a company, and/or other types of affiliations. The type of the affiliation may be conveyed by one or more of text, an image, a number, and/or other information.

Individual ones of the user identification fields 210 may include information that identifies one or more users belonging to the given primary affiliation. Examples of information that identifies users belonging to the given primary affiliation may include one or more of a name of a user, an image associated with a user, a username associated with a user, a nickname associated with a user, and/or other information configured to identify a user.

The accept/decline field 212 may be selectable and/or configured to receive an entry to enable the first user to join or otherwise initiate joining one or more of the secondary affiliations associated with the secondary affiliation fields 204. In some implementations, the first user may join all of the secondary affiliations associated with the secondary affiliation fields 204 at the same time. In some implementations, the first user may join only selected ones of the secondary affiliations associated with the secondary affiliation fields 204. The accept/decline field 212 may provide a request to join individual ones of the secondary affiliations associated with the secondary affiliation fields 204. In order to join, such a request may require approval by one or more other users belonging to individual ones of the secondary affiliations associated with the secondary affiliation fields 204.

A given one of the secondary affiliation fields 204 associated with a given secondary affiliation may include one or more of a virtual space identification field 214, an affiliation type field 216, one or more user identification fields 218, an accept/decline field 220, and/or other fields and/or information associated with the given secondary affiliation.

The virtual space identification field 214 may include information that identifies a virtual space in which the given secondary affiliation exists. Examples of information that identifies a virtual space may include one or more of a name of a virtual space, an image associated with a virtual space, and/or other information configured to identify a virtual space.

The affiliation type field 216 may include information that identifies a type of the given secondary affiliation. Examples of a type of a secondary affiliation may include one or more of an alliance, a guild, a faction, a club, an association, a group, a crew, a band, a clan, a family, fellowship, a gang, a league, a partnership, a syndicate, a society, a tribe, a troop, a company, and/or other types of affiliations. The type of the affiliation may be conveyed by one or more of text, an image, a number, and/or other information.

Individual ones of the user identification fields 218 may include information that identifies one or more users belonging to the given secondary affiliation. Examples of information that identifies users belonging to the given secondary affiliation may include one or more of a name of a user, an image associated with a user, a username associated with a user, a nickname associated with a user, and/or other information configured to identify a user. In some implementations, only user belonging to the given secondary affiliation and who have an existing relationship with the first user are identified by user identification fields 218.

The accept/decline field 220 may be selectable and/or configured to receive an entry to enable the first user to join or otherwise initiate joining the given secondary affiliation associated with the given secondary affiliation field 204. The accept/decline field 220 may provide a request to join the given secondary affiliation associated with the given secondary affiliation field 204. In order to join, such a request may require approval by one or more other users belonging to the given secondary affiliation associated with the given secondary affiliation field 204. In some implementations, accept/decline field 220 may be configured to enable the first user to designate the given secondary affiliation as one to be joined via accept/decline field 212 of the given primary affiliation field 202.

Figure 3:
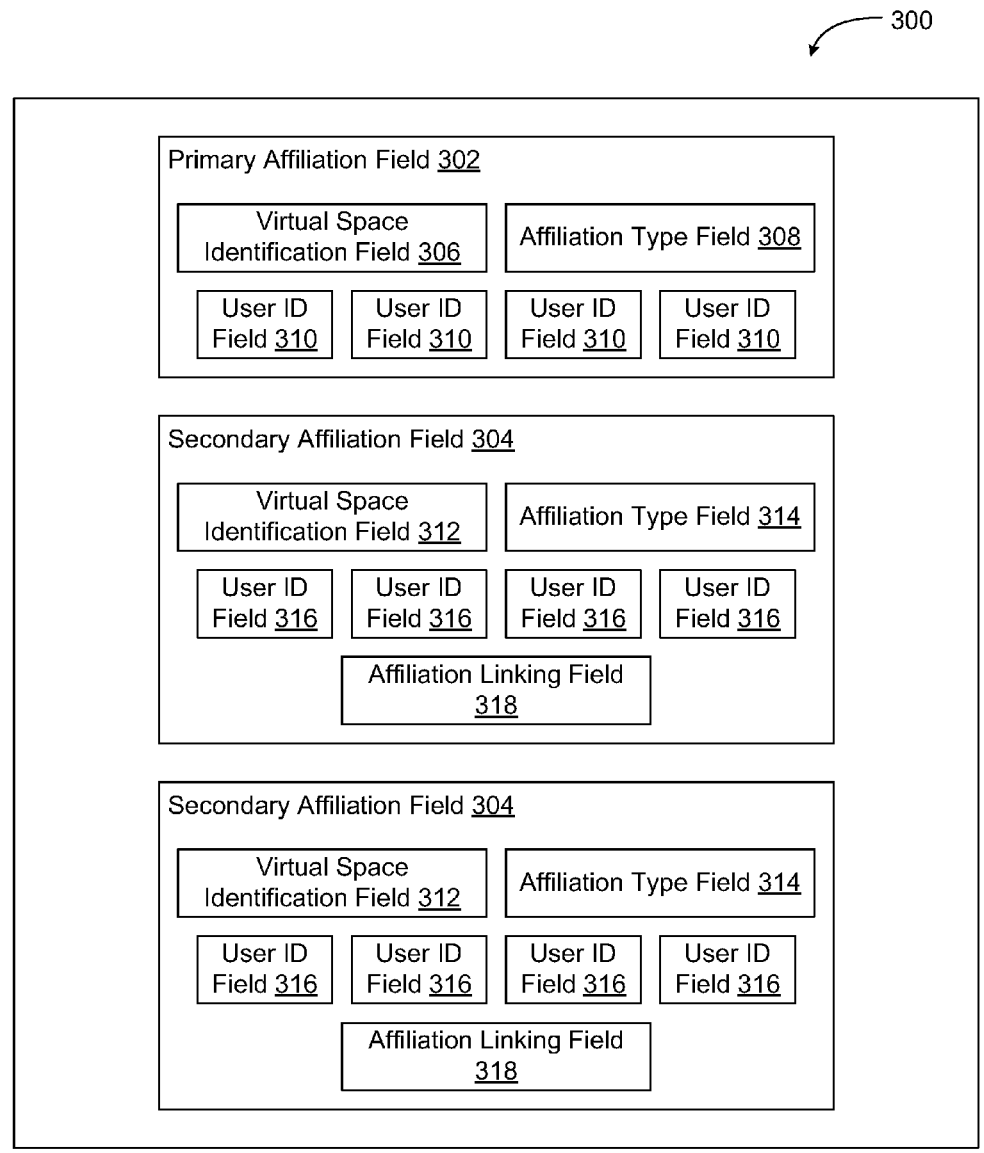
FIG. 3 illustrates a user interface configured to enable a user to link two or more affiliations so that the linked affiliations are encompassed by a single overarching affiliation, in accordance with one or more implementations.

FIG. 3 illustrates a user interface 300 configured to enable a first user to link two or more affiliations so that the linked affiliations are encompassed by a single overarching affiliation, in accordance with one or more implementations. The user interface 300 may be presented to the first user via a client computing platform 106 associated with the first user. The user interface 300 may be presented within a virtual environment provided by virtual environment server 102, within a virtual space provided by virtual space server 104, and/or outside of a virtual environment and/or virtual space. The user interface 300 may be provided by recommendation module 122, overarching group module 124, and/or other modules of virtual space server 104. The user interface 300 may be presented to the first user responsive to the first user joining an affiliation encompassed by an overarching affiliation; the first user belonging to an affiliation encompassed by an overarching affiliation and engaging in the virtual space in which that affiliation exists; the first user engaging in a virtual space in which an affiliation exists that is encompassed by an overarching affiliation, wherein the first user does not belong to that affiliation, but belongs to another affiliation in another virtual space that is also encompassed by the overarching affiliation; and/or other actions by the first user and/or other users. As depicted in FIG. 3, user interface 300 includes one or more primary affiliation fields 302, one or more secondary affiliation fields 304, and/or other elements. The depiction of user interface 300 in FIG. 3 is not intended to be limiting as user interface 300 may include more or less elements than those shown.

The primary affiliation fields 302 may be associated with primary affiliations, while secondary affiliation fields 304 may be associated with secondary affiliations. The first user may belong to the primary affiliations. The first user may or may not belong to the secondary affiliations. The primary affiliations may be encompassed by a first overarching affiliation. The secondary affiliations may not be encompassed by the first overarching affiliation. The first user may be currently engaged in a virtual space in which a primary affiliation exists, currently engaged in a virtual environment in which such a virtual space can be accessed, and/or not engaged in such a virtual space and/or virtual environment.

A given one of the primary affiliation fields 302 associated with a given primary affiliation may include one or more of a virtual space identification field 306, an affiliation type field 308, one or more user identification fields 310, and/or other fields and/or information associated with the given primary affiliation.

The virtual space identification field 306 may include information that identifies a virtual space in which the given primary affiliation exists. Examples of information that identifies a virtual space may include one or more of a name of a virtual space, an image associated with a virtual space, and/or other information configured to identify a virtual space.

The affiliation type field 308 may include information that identifies a type of the given primary affiliation. Examples of a type of a primary affiliation may include one or more of an alliance, a guild, a faction, a club, an association, a group, a crew, a band, a clan, a family, fellowship, a gang, a league, a partnership, a syndicate, a society, a tribe, a troop, a company, and/or other types of affiliations. The type of the affiliation may be conveyed by one or more of text, an image, a number, and/or other information.

Individual ones of the user identification fields 310 may include information that identifies one or more users belonging to the given primary affiliation. Examples of information that identifies users belonging to the given primary affiliation may include one or more of a name of a user, an image associated with a user, a username associated with a user, a nickname associated with a user, and/or other information configured to identify a user.

A given one of the secondary affiliation fields 304 associated with a given secondary affiliation may include one or more of a virtual space identification field 312, an affiliation type field 314, one or more user identification fields 316, an affiliation linking field 318, and/or other fields and/or information associated with the given secondary affiliation.

The virtual space identification field 312 may include information that identifies a virtual space in which the given secondary affiliation exists. Examples of information that identifies a virtual space may include one or more of a name of a virtual space, an image associated with a virtual space, and/or other information configured to identify a virtual space.

The affiliation type field 314 may include information that identifies a type of the given secondary affiliation. Examples of a type of a secondary affiliation may include one or more of an alliance, a guild, a faction, a club, an association, a group, a crew, a band, a clan, a family, fellowship, a gang, a league, a partnership, a syndicate, a society, a tribe, a troop, a company, and/or other types of affiliations. The type of the affiliation may be conveyed by one or more of text, an image, a number, and/or other information.

Individual ones of the user identification fields 316 may include information that identifies one or more users belonging to the given secondary affiliation. Examples of information that identifies users belonging to the given secondary affiliation may include one or more of a name of a user, an image associated with a user, a username associated with a user, a nickname associated with a user, and/or other information configured to identify a user. In some implementations, only user belonging to the given secondary affiliation and who have an existing relationship with the first user are identified by user identification fields 316.

The affiliation linking field 318 may be selectable and/or configured to receive an entry to enable the first user to link the given secondary affiliation so that the given secondary affiliation is encompassed by the first overarching affiliation. The first user may link the given secondary affiliation by selecting a check box and/or radio button, entering text, clicking an icon, and/or providing another indication to link the given secondary affiliation.

Figure 4:
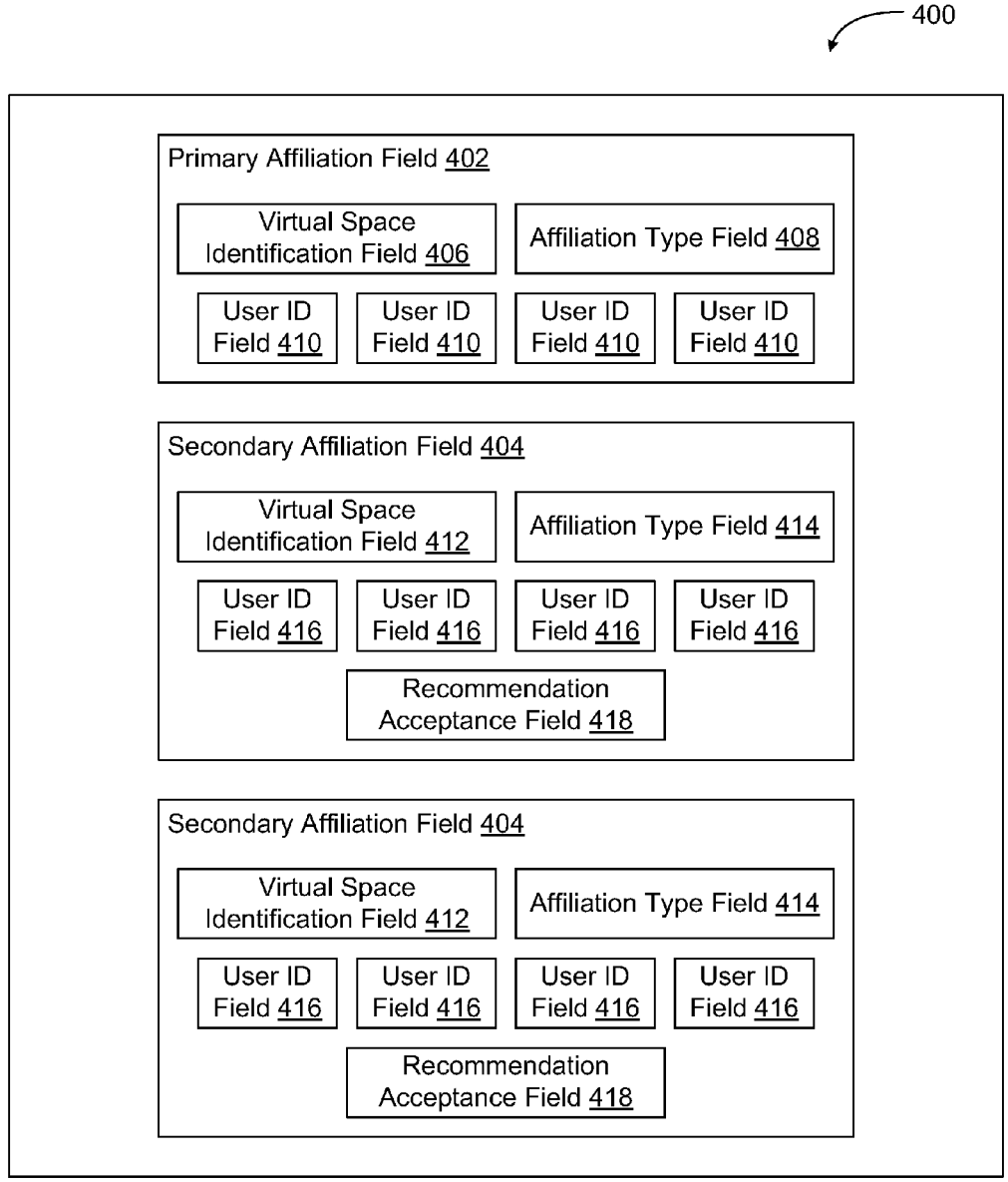
FIG. 4 illustrates a user interface configured to recommend a first user to join one or more affiliations in different virtual spaces responsive to the first user and/or a second user having an existing relationship the first user joining a virtual space encompassed by the same overarching affiliation as the one or more affiliations in the different virtual spaces, in accordance to one or more affiliations.

FIG. 4 illustrates a user interface 400 configured to recommend a first user to join one or more affiliations in different virtual spaces responsive to the first user and/or a second user having an existing relationship the first user joining a virtual space encompassed by the same overarching affiliation as the one or more affiliations in the different virtual spaces, in accordance to one or more affiliations. The user interface 400 may be presented to the first user via a client computing platform 106 associated with the first user. The user interface 400 may be presented within a virtual environment provided by virtual environment server 102, within a virtual space provided by virtual space server 104, and/or outside of a virtual environment and/or virtual space. The user interface 400 may be provided by recommendation module 122, overarching group module 124, and/or other modules of virtual space server 104. The user interface 400 may be presented to the first user responsive to the first user joining an affiliation encompassed by an overarching affiliation; the first user belonging to an affiliation encompassed by an overarching affiliation and engaging in the virtual space in which that affiliation exists; the first user engaging in a virtual space in which an affiliation exists that is encompassed by an overarching affiliation, wherein the first user does not belong to that affiliation, but belongs to another affiliation in another virtual space that is also encompassed by the overarching affiliation; and/or other actions by the first user and/or other users. As depicted in FIG. 4, user interface 400 includes one or more primary affiliation fields 402, one or more secondary affiliation fields 404, and/or other elements. The depiction of user interface 400 in FIG. 4 is not intended to be limiting as user interface 400 may include more or less elements than those shown.

The primary affiliation fields 402 may be associated with primary affiliations, while secondary affiliation fields 404 may be associated with secondary affiliations. The primary and secondary affiliations may be encompassed by the same overarching affiliation. The first user and the second user may belong to the primary affiliations so that the first user and the second user have a relationship in the primary affiliations. The first user may have joined a given one of the secondary affiliations and the second user may not belong to the given secondary affiliation, or the second user may have joined the given secondary affiliation and the first user may not belong to the given secondary affiliation. The user interface 400 may be presented to the first user responsive to the first user or the second user joining the given secondary affiliation. The user interface 400 may include recommendations that the first user join one or more of the secondary affiliations to which the second user belongs. The first user may be currently engaged in a virtual space in which a primary affiliation exists, currently engaged in a virtual environment in which such a virtual space can be accessed, and/or not engaged in such a virtual space and/or virtual environment.

A given one of the primary affiliation fields 402 associated with a given primary affiliation may include one or more of a virtual space identification field 406, an affiliation type field 408, one or more user identification fields 410, and/or other fields and/or information associated with the given primary affiliation.

The virtual space identification field 406 may include information that identifies a virtual space in which the given primary affiliation exists. Examples of information that identifies a virtual space may include one or more of a name of a virtual space, an image associated with a virtual space, and/or other information configured to identify a virtual space.

The affiliation type field 408 may include information that identifies a type of the given primary affiliation. Examples of a type of a primary affiliation may include one or more of an alliance, a guild, a faction, a club, an association, a group, a crew, a band, a clan, a family, fellowship, a gang, a league, a partnership, a syndicate, a society, a tribe, a troop, a company, and/or other types of affiliations. The type of the affiliation may be conveyed by one or more of text, an image, a number, and/or other information.

Individual ones of the user identification fields 410 may include information that identifies one or more users belonging to the given primary affiliation. Examples of information that identifies users belonging to the given primary affiliation may include one or more of a name of a user, an image associated with a user, a username associated with a user, a nickname associated with a user, and/or other information configured to identify a user.

A given one of the secondary affiliation fields 404 associated with a given secondary affiliation may include one or more of a virtual space identification field 412, an affiliation type field 414, one or more user identification fields 416, a recommendation acceptance field 418, and/or other fields and/or information associated with the given secondary affiliation.

The virtual space identification field 412 may include information that identifies a virtual space in which the given secondary affiliation exists. Examples of information that identifies a virtual space may include one or more of a name of a virtual space, an image associated with a virtual space, and/or other information configured to identify a virtual space.

The affiliation type field 414 may include information that identifies a type of the given secondary affiliation. Examples of a type of a secondary affiliation may include one or more of an alliance, a guild, a faction, a club, an association, a group, a crew, a band, a clan, a family, fellowship, a gang, a league, a partnership, a syndicate, a society, a tribe, a troop, a company, and/or other types of affiliations. The type of the affiliation may be conveyed by one or more of text, an image, a number, and/or other information.

Individual ones of the user identification fields 416 may include information that identifies one or more users belonging to the given secondary affiliation. Examples of information that identifies users belonging to the given secondary affiliation may include one or more of a name of a user, an image associated with a user, a username associated with a user, a nickname associated with a user, and/or other information configured to identify a user. In some implementations, only user belonging to the given secondary affiliation and who have an existing relationship with the first user are identified by user identification fields 416.

The recommendation acceptance field 418 may be selectable and/or configured to receive an entry to enable the first user to accept a recommendation to join a secondary affiliation. In some implementations, the recommendation acceptance field 418 may provide a request to join a secondary affiliation associated with a secondary affiliation field 204. In order to join, such a request may require approval by one or more other users belonging to the secondary affiliation associated with the secondary affiliation field 204.

Figure 5:
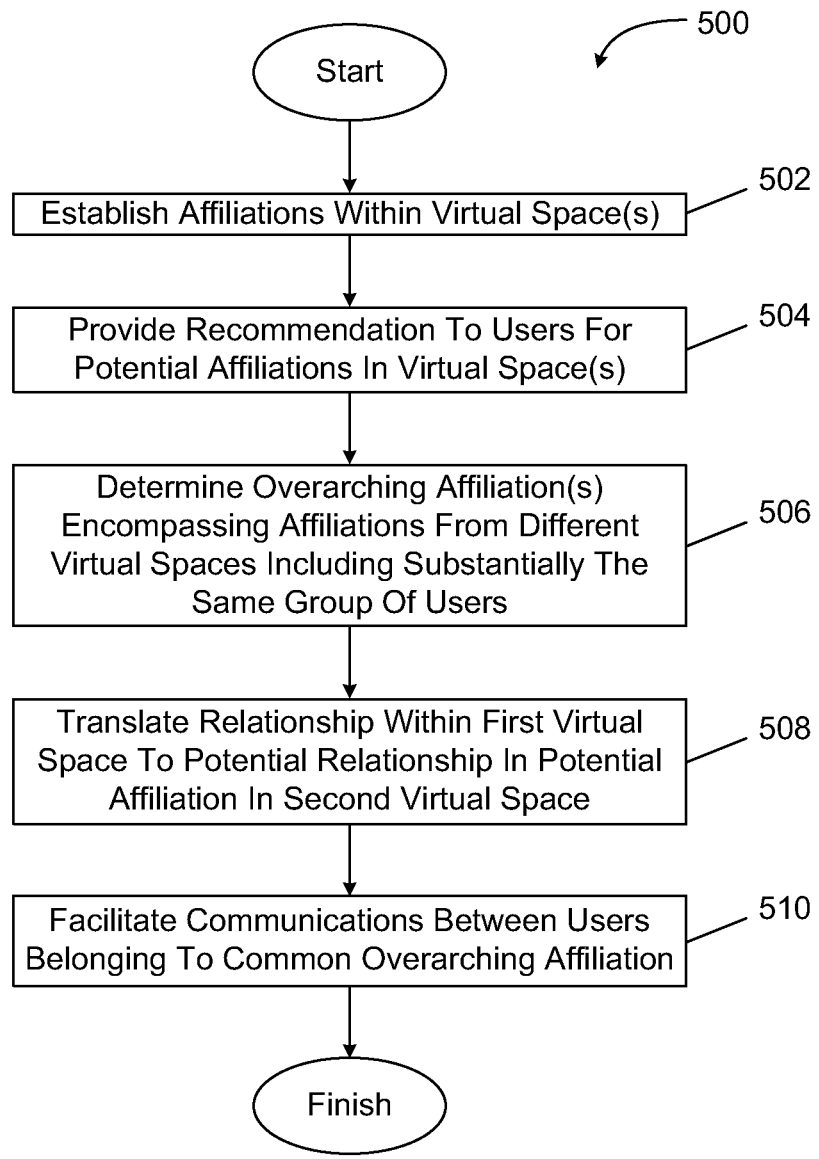
FIG. 5 illustrates a method for facilitating affiliations between users across two or more virtual spaces accessible via virtual environments, in accordance with one or more implementations.

FIG. 5 illustrates a method 500 for facilitating affiliations between users across two or more virtual spaces accessible via virtual environments, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, affiliations may be established within individual ones of the two or more virtual spaces. A given affiliation within a given virtual space may comprise a discrete group of users with a relationship having a functional significance within the given virtual space. The affiliations may comprise a first affiliation within a first virtual space between a group of users including a first user and a second user. In accordance with some implementations, operation 502 may be performed by a group module that is the same or similar to group module 120.

At an operation 504, a recommendation may be provided for potential affiliations to users in the two or more virtual spaces. In some implementations, responsive to the first user having an account in a second virtual space, and responsive to the second user creating an account in the second virtual space, the first user may be recommended to the second user for a potential affiliation in the second virtual space based on the first affiliation. In accordance with some implementations, operation 504 may be performed by a recommendation module that is the same or similar to recommendation module 122.

At an operation 506, one or more overarching affiliations may be determined. An individual overarching affiliation may encompass two or more affiliations from different virtual spaces that include substantially the same group of users. In accordance with some implementations, operation 506 may be performed by an overarching group module that is the same or similar to overarching group module 126.

At an operation 508, a relationship between the first user and the second user in the first affiliation within the first virtual space may be translated to a potential relationship between the first user and the second user in the potential affiliation in the second virtual space. In accordance with some implementations, operation 508 may be performed by a translation module that is the same or similar to translation module 124.

At an operation 510, communications between users belonging to a common overarching affiliation may be facilitated. The communications may occur within a virtual environment, within a virtual space, and/or outside of a virtual environment or virtual space. In accordance with some implementations, operation 510 may be performed by a communications module that is the same or similar to communications module 128.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate affiliations between users across two or more online games accessible via virtual environments, the system comprising:
   one or more processors configured to execute computer program modules, the computer program modules comprising:
   a group module configured to establish affiliations within individual ones of the two or more online games, a given affiliation within a given online game comprising a discrete group of users with a relationship having a functional significance within the given online game, wherein the affiliations comprise a first affiliation within a first online game between a group of users including a first user and a second user;
   a recommendation module configured to automatically recommend potential affiliations to users in the two or more online games, wherein the recommendation module is configured such that responsive to the first user having an account in a second online game and a second affiliation within the second online game between a discrete group of users of the second online game, and responsive to the second user creating an account in the second online game, the first user and the second affiliation are automatically recommended to the second user for a potential affiliation in the second online game based on the first affiliation; and
   an overarching group module configured to determine one or more overarching affiliations, individual ones of the overarching affiliations encompassing two or more affiliations from different online games that include substantially the same group of users.

2. The system of claim 1, wherein the recommendation module is configured to enable the second user to opt-in or opt-out of the potential affiliation with the first user.

3. The system of claim 1, wherein a relationship between the first user and the second user in the first affiliation within the first online game has a different functional significance than a potential relationship between the first user and the second user in the potential affiliation in the second online game.

4. The system of claim 1, further comprising a communications module configured to facilitate communications between users belonging to a common overarching affiliation.

5. The system of claim 4, wherein the communications occur within the virtual environment.

6. The system of claim 4, wherein the communications occur outside of the virtual environment.

7. The system of claim 1, wherein the group module is configured to automatically include a given user belonging to a given overarching affiliation in individual affiliations encompassed by the given overarching affiliation.

8. The system of claim 1, wherein a given overarching affiliation is configured to facilitate one or more of a cooperative attack, a cooperative defense, resource trading, or troupe enforcements in individual ones of the two or more online games by individual users belonging to the given overarching affiliation.

9. The system of claim 1, further comprising a translation module configured to translate a relationship between the first user and the second user in the first affiliation within the first online game to a potential relationship between the first user and the second user in the potential affiliation in the second online game.

10. A computer-implemented method for facilitating affiliations between users across two or more online games accessible via virtual environments, the method implemented on a computer system that includes one or more computer processors, the method comprising:

establishing affiliations within individual ones of the two or more online games, a given affiliation within a given online game comprising a discrete group of users with a relationship having a functional significance within the given online game, wherein the affiliations comprise a first affiliation within a first online game between a group of users including a first user and a second user;

providing automatically, using the one or more processors, a recommendation for potential affiliations to users in the two or more online games such that responsive to the first user having an account in a second online game and a second affiliation within the second online game between a discrete group of users of the second online game, and responsive to the second user creating an account in the second online game, the first user and the second affiliation are automatically recommended to the second user for a potential affiliation in the second online game based on the first affiliation; and, determining one or more overarching affiliations, individual ones of the overarching affiliations encompassing two or more affiliations from different online games that include substantially the same group of users.

11. The computer-implemented method of claim 10, further comprising enabling the second user to opt-in or opt-out of the potential affiliation with the first user.

12. The computer-implemented method of claim 10, wherein a relationship between the first user and the second user in the first affiliation within the first online game has a different functional significance than a potential relationship between the first user and the second user in the potential affiliation in the second online game.

13. The computer-implemented method of claim 10, further comprising facilitating communications between users belonging to a common overarching affiliation.

14. The computer-implemented method of claim 13, wherein the communications occur within the virtual environment.

15. The computer-implemented method of claim 13, wherein the communications occur outside of the virtual environment.

16. The computer-implemented method of claim 10, further comprising automatically including a given user belonging to a given overarching affiliation in individual affiliations encompassed by the given overarching affiliation.

17. The computer-implemented method of claim 10, wherein a given overarching affiliation is configured to facilitate one or more of a cooperative attack, a cooperative defense, resource trading, or troupe enforcements in individual ones of the two or more online games by individual users belonging to the given overarching affiliation.

18. The computer-implemented method of claim 10, further comprising translating a relationship between the first user and the second user in the first affiliation within the first online game to a potential relationship between the first user and the second user in the potential affiliation in the second online game.

* * * * *